March 30, 1954     W. W. HOFFMANN     2,673,685
INTERMITTENT COUNTER DRIVE
Filed Jan. 29, 1951     2 Sheets-Sheet 1
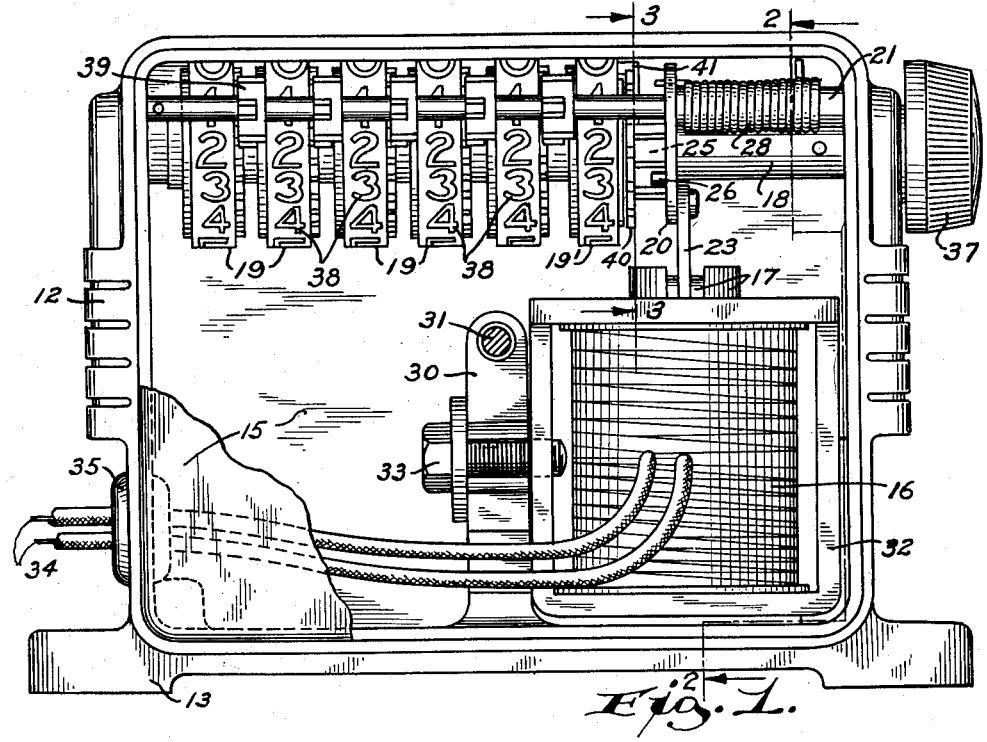
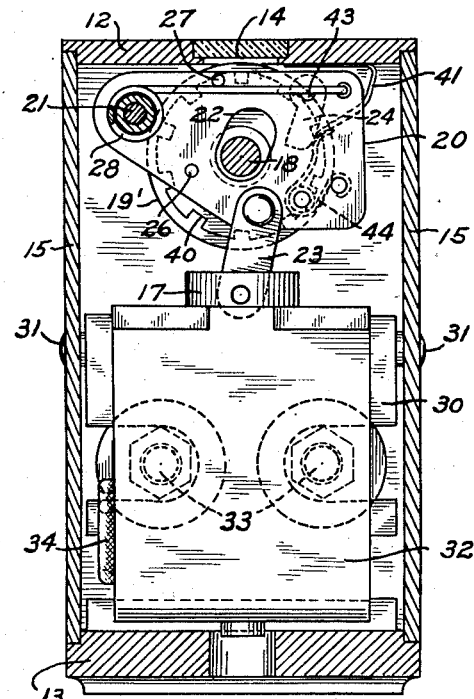
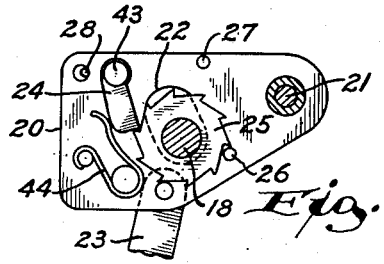
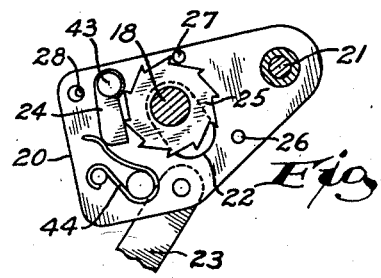
INVENTOR.
W. W. Hoffmann
BY
Lieber & Lieber
ATTORNEYS.

March 30, 1954 — W. W. HOFFMANN — 2,673,685
INTERMITTENT COUNTER DRIVE
Filed Jan. 29, 1951 — 2 Sheets-Sheet 2
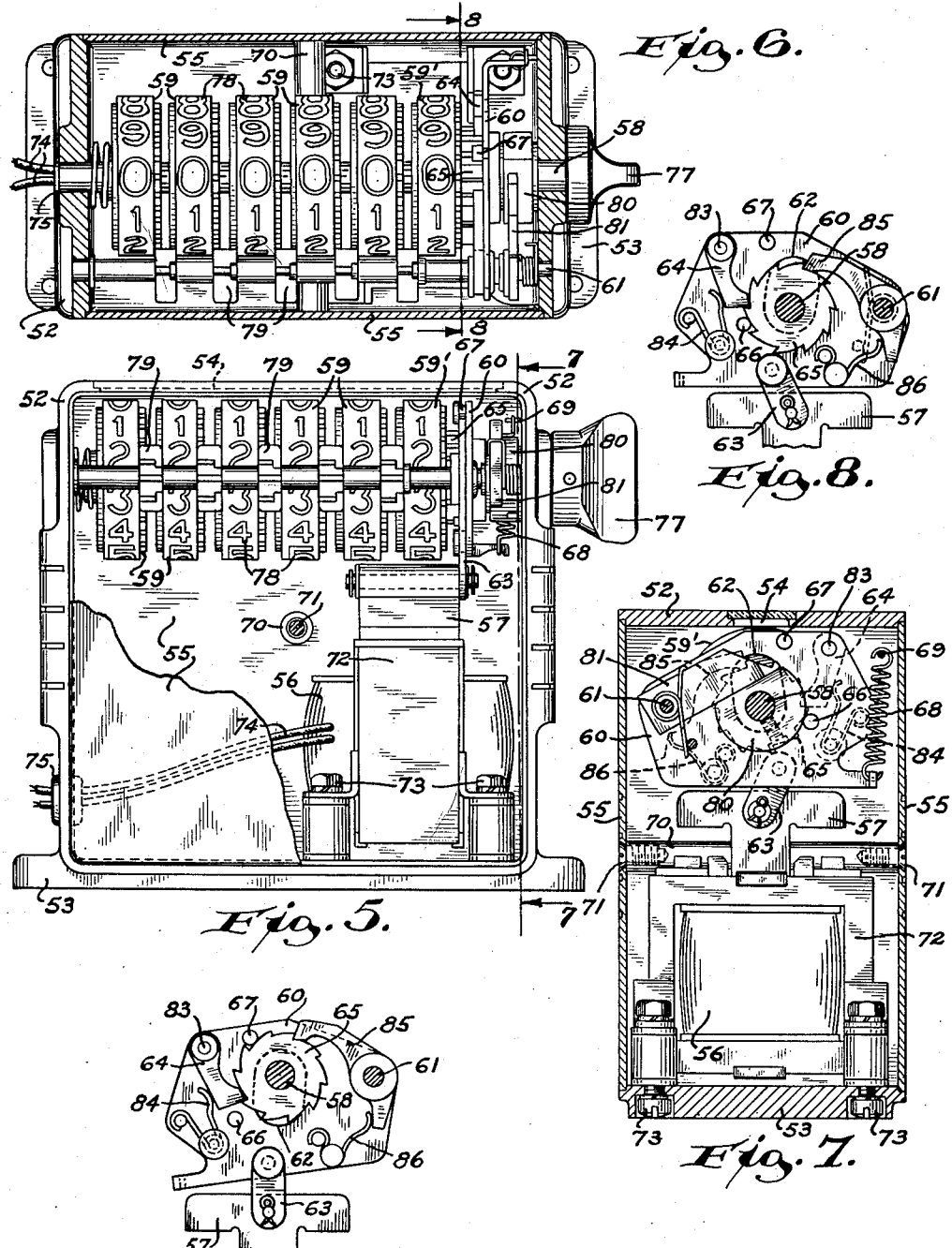
INVENTOR.
W. W. Hoffmann
BY Lieber & Lieber
ATTORNEYS.

Patented Mar. 30, 1954

2,673,685

UNITED STATES PATENT OFFICE 2,673,685

INTERMITTENT COUNTER DRIVE

Walter W. Hoffmann, Milwaukee, Wis., assignor to Durant Manufacturing Co., Milwaukee, Wis., a corporation of Wisconsin Application January 29, 1951, Serial No. 208,283

1 Claim. (Cl. 235—92)

The present invention relates generally to improvements in rotary counters, and relates more specifically to improvements in the construction and operation of mechanism for transmitting motion from a reciprocating or oscillating driving source to the rotary numeral wheels of a decimal counter or the like.

The primary object of my invention is to provide an improved intermittent drive for the rotary numeral wheels of a counter, which is simple in construction and highly efficient in operation.

Rotary counters have heretofore been used to tally or count operations derived from various sources such as rotary, oscillatory and reciprocable machine elements; and while the prior rotary driving sources have given little trouble, considerable difficulty has been encountered with the previous intermittently oscillating or reciprocating counter drives especially when operated at high speed. Most of these prior intermittent drives are relatively complicated, while others tend to occasionally skip or repeat a count, thus making it impossible to insure continued and reliably accurate functioning of the counters for prolonged periods of time and without excessive attention.

It is therefore a more specific important object of the present invention to provide an improved mechanism for driving the rotary numeral wheels of a counter from any oscillatory or reciprocable source, which is simple and durable in structure, and is also operable at high speed with utmost precision.

Another important object of this invention is to provide a compact and exceedingly reliable rotary counter wheel drive comprising only a few relatively simple parts, and which is especially adapted to be actuated by an electric solenoid or the like.

A further important object of the invention is to provide an improved intermittent counter drive for transmitting reciprocating or oscillatory movement to the numeral wheels of rotary counters without interfering with the wheel resetting mechanism of the counters, and which may be accurately reproduced at moderate cost for application to counting assemblages of various sizes and for diverse uses.

Still another object of my invention is to provide an improved non-skip, oscillatory drive for rotary decimal counters, which insures accurate tallying of each and every operation and requires no attention.

These and other objects and advantages of the invention will be apparent from the following detailed description.

A clear conception of the specific features constituting the present improvement, and of the construction and operation of several typical solenoid actuated counters embodying the invention, may be had by referring to the drawings accompanying and forming a part of this specification wherein like reference characters designate the same or similar parts in the various views.

Fig. 1 is a front view of one simple type of commercial solenoid actuated rotary counter having the front closure cover partly broken away to reveal the normally concealed mechanism;

Fig. 2 is a transverse vertical section through the counter of Fig. 1 taken along the irregular line 2—2 and looking toward the numeral wheels and the solenoid;

Fig. 3 is a fragmentary sectional view of the improved motion transmitting mechanism of the counter illustrated in Figs. 1 and 2, taken along the line 3—3 of Fig. 1 and showing the oscillatory lever plate in uppermost position;

Fig. 4 is a view similar to that of Fig. 3, but showing the oscillatory lever plate in lowermost position.

Fig. 5 is a front view of a modified type of heavy duty solenoid actuated rotary counter also having a portion of the front cover broken away to reveal internal structure;

Fig. 6 is a transverse horizontal section through the upper counter wheel housing portion of the counter unit taken along the irregular line 6—6 of Fig. 5;

Fig. 7 is a transverse vertical section through the counter of Figs. 5 and 6 taken along the line 7—7 of Fig. 5 and looking toward the left;

Fig. 8 is a fragmentary sectional view of the modified improved motion transmitting mechanism of the counter illustrated in Figs. 5, 6, and 7 taken along the line 8—8 of Fig. 6 and showing the oscillatory lever plate in uppermost position; and Fig. 9 is a view similar to that of Fig. 8, but showing the oscillating lever plate in lowermost position.

The gist of the present invention is the provision of a simple and dependable mechanism for transferring either reciprocating or oscillatory driving motion from a power source to the rotary numeral wheels of a counter with the aid of an oscillatory lever plate provided with means for positively preventing skipping or missing of counts during normal operation of the counter at any desired speed, and while the invention is advantageously applicable to electrically energized solenoid actuated counters such as shown herein by way of illustration, it is not desired to unnecessarily limit the utility of the improved structure to such counter units. It is also contemplated that specific descriptive terms employed herein be given the broadest possible interpretation consistent with the actual disclosure.

Referring to Figs. 1 to 4 inclusive of the drawing, the typical simplified light duty counting unit shown therein comprises in general, a casing 12 having a lower base 13 and an upper sight opening 14 and being provided with removable front and rear closures 15; an electric solenoid detachably secured within the lower portion of the casing 12 and having a fixed energizing coil 16 cooperating with a reciprocable magnetic core 17; a rotary counter mounted upon a normally stationary reset shaft 18 journalled in and spanning the upper interior of the casing 12 and having a series of drivingly interconnected numeral wheels 19', 19 of successively higher order normally rotatable thereabout in one direction; an oscillatory lever plate 20 swingably suspended from a fixed pivot 21 secured to an end wall of the casing 12 and having a central slot 22 through which the shaft 18 projects, while its swinging portion is connected to the solenoid core 17 by a link 23; a pawl 24 pivotally attached to the plate 20 and being resiliently urged toward the teeth of a ratchet wheel 25 secured to the numeral wheel 19' of lowest order; non-skip lower and upper pins 26, 27 respectively projecting laterally from the plate 20 and being alternately cooperable with the teeth of the wheel 25; and a torsion spring 28 surrounding the pivot 21 and coacting with the casing 12 and plate 20 to constantly urge the latter downwardly.

The main housing or casing 12 and its base 13 may be formed as a unitary structure, and the base 13 is provided with an integral upstanding lug 30 to which the covers or closures 15 may be detachably secured by means of screws 31. The sight opening 14 at the top of the casing 12 is preferably closed by a transparent window as shown in Fig. 2, and the solenoid coil 16 is confined within a U-shaped frame 32 which may be firmly attached to the base lug 30 by means of cap screws 33, see Figs. 1 and 2. The coil 16 may be intermittently energized from any suitable source of electrical energy through conductors 34 extending externally of the casing 12 through an insulating bushing 35, and the central core 17 of the solenoid is adapted to be moved downwardly whenever the coil 16 is energized and is pulled upwardly by the helical spring 28 upon de-energization of the coil. A reciprocable source of power for actuating the counter is thus provided, but the solenoid may be replaced by any other mechanically actuated reciprocable or oscillatory driving source.

The normally fixed counter reset shaft 18 is provided at one end with an actuating knob 37 disposed externally of the casing 12, and the numeral wheels 19', 19 are of well known construction each having a succession of peripheral numerals 38 of which the alined uppermost numerals are visible through the window opening 14. The adjacent numeral wheels 19', 19 are drivingly interconnected by means of transfer gearing 39, and the numeral wheel 19' of lowest order has the ratchet wheel 25 secured thereto and is provided with a peripherally notched disk 40 with which a pawl spring 41 coacts to prevent reverse rotation of the numeral wheel and of the ratchet wheel 25, see Figs. 1 and 2. All of the numeral wheels 19', 19 of the counter may be rotated to zeroize or reset the same, by rotating the normally fixed shaft 18 with the aid of the knob 37, in a well known manner, and since this shaft 18 extends freely through the slot 22 resetting of the counter does not affect and is not interfered with by the lever plate 20.

As previously indicated, the oscillatory motion transmitting lever or plate 20 is swingable about the fixed pivot 21 by means of the solenoid core 17 acting thereon in one direction, and the torsion spring 28 acting in the opposite direction. The pawl 24 is swingably suspended from the plate 20 by a pivot pin 43 and is constantly urged toward the ratchet wheel 25 by means of a leaf spring 44 also carried by the lever plate. The two non-skip pins 26, 27 which are carried by and project laterally of the lever plate 20 are so disposed, that when the plate 20 is swung into its uppermost position by the torsion spring 28 as in Fig. 3 the pawl 24 and the lower pin 26 will engage the adjacent teeth of the ratchet wheel 25, whereas downward swinging of the plate 20 into its lowermost position as in Fig. 4 by the solenoid core 17 will cause the upper pin 27 to likewise engage the adjacent ratchet wheel tooth. This assemblage of elements is therefore such that during each complete up and down oscillation of the motion transfer lever plate 20 by the spring 28 and the solenoid, the pawl 24 will travel downwardly to successively rotate the ratchet wheel 25 and the numeral wheel 19' of lowest order by steps equal to one tenth of a revolution, while the pin 27 will function to automatically and positively prevent the wheel 25 from travelling beyond a tooth length and the spring 41 coacting with the holding disk 40 will prevent reverse rotation of the wheel 25.

Referring to Figs. 5 to 9 inclusive, the modified heavy duty counter unit shown therein, comprises in general, a housing 52 having a base 53 and an upper sight opening 54 and being provided with removable front and rear covers 55; an electric solenoid mounted upon the base 53 and having a fixed coil 56 and a reciprocable armature core 57; a rotary counter having a series of numeral wheels 59', 59 rotatably mounted upon a normally fixed reset shaft 58 journalled in and spanning the upper interior of the housing 52; an oscillatory lever plate 60 swingably suspended from a stationary pivot 61 secured to an end wall of the housing 52 and being provided with a slot 62 through which the shaft 58 projects, while its lower swinging portion is connected to the solenoid core 57 by a link 63; a counter wheel rotating pawl 64 swingably suspended from the lever plate 60 and being constantly urged toward the teeth of a ratchet wheel 65 secured to the numeral wheel 59' of lowest order; lower and upper non-skip pins 66, 67 respectively projecting laterally from the plate 60 and being alternately cooperable with the teeth of the wheel 65; and a helical tension spring 68 connecting the swinging end of the lever plate 60 with a pin 69 secured to the adjacent end wall of the housing 52.

The casing or housing 52 and the base 53 may be formed integral, and the closure covers 55 are detachably secured to the opposite ends of a transverse strut 70 by screws 71. The sight opening 54 is enclosed by a transparent window, and the solenoid coil 56 is mounted within a magnetic frame 72 which is firmly attached to the base 53 by means of screw bolts 73 and nuts, as shown in Figs. 5 and 7. The coil 56 may be intermittently energized from any desired source of electric energy through conductors 74 extending through bushings 75, and the armature core 57 of the solenoid is adapted to be moved down into engagement with the magnetic frame 72 whenever the coil 56 is energized, and is pulled up by the spring 68 upon de-energization of the solenoid coil. A reciprocable source of actuating power for the counter wheels is thus provided, but any other reciprocable or oscillatory driving source may be substituted for the solenoid drive.

The normally stationary counter resetting shaft 58 is provided externally of the housing 52 with an actuating knob 77, and the numeral wheels 59', 59 of this heavy duty counter are also of well known construction each having a series of numerals 78 the alined uppermost of which are visible through the window opening 54. The adjacent numeral wheels 59', 59 are drivingly interconnected by transfer gearing 79, and the reset shaft 58 is normally held against rotation by a cam 80 secured to this shaft, and a spring pressed latch 81 swingably mounted upon the fixed pivot 61 and coacting with a flat face on the cam 80, see Figs. 5, 6, and 7. All of the numeral wheels 59', 59 of the counter can be revolved to zeroize or reset the same, by forcibly rotating the shaft 58 with the aid of the knob 77, and in view of the fact that this shaft 58 extends freely through the slot 62 of the lever plate 60, resetting of the counter wheels does not interfere with the plate 60.

As heretofore indicated, the oscillatory motion transmitting lever plate 60 is swingable in a downward direction about the fixed pivot 61 by the armature core 57 and is swingable upwardly by the tension spring 68, and the ratchet wheel rotating pawl 64 is pivotally suspended from the swinging end of the plate 60 by a pin 83 as depicted in Figs. 7, 8 and 9. The pawl 64 is constantly urged toward the peripheral teeth of the ratchet wheel 65 by a leaf spring 84, and a holding pawl 85 is swingably suspended from the fixed pivot 61 and is resiliently urged against the ratchet wheel 65 by another leaf spring 86, this pawl 85 functioning to prevent reverse rotation of the ratchet wheel. The non-skip pins 66, 67 which project laterally from the lever plate 60 are positioned so that when the plate is swung into its uppermost position as in Fig. 8, the pawl 64 and the lower pin 66 will function to prevent reverse rotation of the wheel 65, whereas swinging of the plate 60 into its lowermost position as in Fig. 9 will cause the upper pin 67 to prevent overtravel of the wheel 65. This assemblage is therefore such that during each complete oscillation of the lever plate 60 by the spring 68 and armature core 57, the pawl 64 will travel downwardly to successively rotate the ratchet wheel 65 and the numeral wheel 59' of lowest order by steps equal to one tenth of a revolution, and the pin 67 will always function to automatically and positively prevent the wheel 65 from travelling beyond a tooth length, while the pawl 85 and pin 66 will prevent reverse rotation of the wheel 65.

The normal operation of the light and heavy duty counters herein illustrated and described, should be clearly apparent from the foregoing detailed description, and in each of these units the successive impulses or reciprocations of the solenoid will result in the registration of one count by the rotary numeral wheel of lowest order. In each of the two embodiments of the invention specifically shown, each reciprocation of the solenoid plunger or core is converted into intermittent rotary motion of one-tenth of a revolution at the counter wheel nearest its propelling ratchet, by the oscillatory lever plate, and the upper anti-skip pins 27, 67 associated with the plates 20, 60 respectively, are especially adapted to positively prevent skipping of a count regardless of the speed or frequency of the reciprocations, while the pawls 24, 64 will prevent reverse rotation even if the lower pins 26, 66 are omitted. In the embodiment of Fig. 1 the notched disk 40 and the pawl spring 41 positively prevent reverse rotation of the counter wheels; whereas in the embodiment of Fig. 5, the holding pawl 85 and spring 86 perform a like function. In both cases the rotary numeral wheels may be reset or zeroized at any time without interfering with the normal motion transfer mechanism; and the improved counters are both exceedingly simple and compact in construction, highly efficient and dependable in operation, and may be produced in various sizes for diverse uses at moderate cost.

It should be understood that it is not desired to limit this invention to the exact details of construction and operation of the solenoid actuated counting units herein specifically shown and described, for various modifications within the scope of the appended claims may occur to persons skilled in the art.

I claim:

In a high speed counter, a casing, a reset shaft spanning the casing interior, a series of coaxial rotary numeral wheels of successively higher order rotatable about said shaft, a pivot shaft also spanning the casing interior adjacent to the peripheries of said wheels, gearing journalled upon said pivot shaft for transferring rotary motion from the numeral wheels of lower order to the adjacent higher order numeral wheels, a ratchet wheel journalled on said reset shaft and having a single series of peripheral teeth of equal length, said ratchet wheel being drivingly cooperable with said numeral wheel of lowest order, an oscillatory plate swingably suspended from said pivot shaft and having an arcuate slot in its medial portion through which said reset shaft extends, an actuating pawl carried by the swinging end of said plate and being cooperable with said teeth to rotate the ratchet wheel in one direction, a reciprocable magnetic core movable within said casing toward and away from said reset shaft in the plane of said plate to cause said pawl to rotate said ratchet wheel by one tooth during each reciprocation of the core, an electric coil for moving said core away from said reset shaft, a link connecting said core with the medial portion of said plate, a torsion spring mounted on said pivot shaft and coacting with said plate to urge said core toward said reset shaft when said coil is deenergized, and a pin carried by said plate and being cooperable with said ratchet wheel only when the plate has been swung into its extreme position toward said coil to positively prevent rotation of the ratchet wheel by more than one tooth during each reciprocation of said core.

WALTER W. HOFFMANN.

References Cited in the file of this patent
UNITED STATES PATENTS

| Number | Name | Date |
| --- | --- | --- |
| 225,044 | Benton | Mar. 2, 1880 |
| 243,500 | Brown | June 28, 1881 |
| 1,506,939 | Pankonin | Sept. 2, 1924 |
| 2,244,601 | Barth | June 3, 1941 |
| 2,310,114 | Poole | Feb. 2, 1943 |
| 2,514,788 | Nelson | July 11, 1950 |

FOREIGN PATENTS

| Number | Country | Date |
| --- | --- | --- |
| 513,969 | Germany | Dec. 5, 1930 |